United States Patent [19]

Koskan et al.

[11] Patent Number: 5,478,919

[45] Date of Patent: Dec. 26, 1995

[54] ASPARTIC ACID COPOLYMERS AND THEIR PREPARATION

[75] Inventors: Larry P. Koskan, Orland Park; James F. Kneller, LaGrange Park; Daniel A. Batzel, Skokie, all of Ill.

[73] Assignee: Donlar Corporation, Bedford Park, Ill.

[21] Appl. No.: 283,268

[22] Filed: Jul. 29, 1994

[51] Int. Cl.$^6$ .................................................. C08G 69/48
[52] U.S. Cl. .................. 528/363; 525/418; 525/419; 525/420; 528/328; 528/332; 528/335; 528/345
[58] Field of Search .................... 525/418, 419, 525/420; 528/328, 363, 332, 335, 345

[56] References Cited

U.S. PATENT DOCUMENTS

| | | | |
|---|---|---|---|
| 2,306,918 | 2/1940 | Weiss et al. | 528/363 |
| 3,846,380 | 10/1972 | Fujimoto et al. | 528/363 |
| 5,292,858 | 3/1994 | Wood | 528/345 |
| 5,357,004 | 10/1994 | Calton et al. | 525/435 |

*Primary Examiner*—Shelley A. Dodson
*Attorney, Agent, or Firm*—Peter R. Bahn

[57] ABSTRACT

Aspartic acid precursors such as mono and diammonium maleate, maleamic acid, ammonium maleamate, ammonium malate and mixtures of these and other precursors are copolycondensed thermally with a variety of mono, di and multifunctional monomers containing amino, hydroxyl and carboxyl functional groups. The resulting condensation copolymers and terpolymers contain succinimide units derived from aspartic acid precursors, condensed with other functional group monomers usually though amide and ester linkages. Hydrolysis of the polysuccinimide copolymers and terpolymers with alkali, alkaline earth and ammonium hydroxide produces aspartic acid copolymer and terpolymer salts.

5 Claims, No Drawings

ASPARTIC ACID COPOLYMERS AND THEIR PREPARATION

FIELD OF THE INVENTION

This invention is in the field of condensation polymer formation. More specifically, this invention is in the field of copolymers of polysuccinimide with other functional group monomers and conversion of these copolymers to salts of the copolymers of aspartic acid.

BACKGROUND OF THE INVENTION AND PRIOR ART

A variety of methods for preparation of polysuccinimide and subsequent hydrolysis to polyaspartic acid (or salts) have been described in the literature and patents. In addition methods of preparation of copolymers of polyaspartic acid have also been reported in the literature.

In a series of patents, Koskan et al. discloses a method for thermal polymerization of aspartic acid in a fluidized bed to form polysuccinimide which is then hydrolyzed to polyaspartic acid (sodium salt) using sodium hydroxide (U.S. Pat No. 5,057,597; U.S. Pat No. 5,116,513; U.S. Pat. No. 5,152,902 and U.S. Pat. No. 5,221,733). Uses of polyaspartic acid as calcium carbonate, calcium and barium sulfate and calcium phosphate scale inhibitors are also described in these patents.

Production of polysuccinimide and polyaspartic acid (and salts) from maleic anhydride, water and aqueous ammonia is taught in patents by Koskan and Meah (U.S. Pat. No. 5,219,952 and U.S. Pat. No. 5,296,578). Polysuccinimide is produced in at least 90% of theoretical yield by heating the maleic anhydride, water, ammonia mixture at 220°–260° C. In U.S. Pat. No. 4,839,461, Boemke teaches the production of a polyaspartic acid salt by the reaction of maleic acid and aqueous ammonia at 120°–150° C. followed by hydrolysis of the resulting acid with metal hydroxides or ammonium hydroxide. A process is disclosed (in U.S. Pat. No. 5,288,783) for the preparation of a salt of polyaspartic acid by reacting maleic acid and ammonia in a molar ratio of 1:1–2.1 at 190°–350° C. for a time followed by hydrolysis of the resultant polymer using metal or ammonium hydroxide.

Fox and Harada ("A Laboratory Manual of Analytical Methods of Protein Chemistry Including Polypeptides," P. Alexander and H. P. Lundgren, Ed., Pergamon Press, Elmsford, N.Y., 1966, p127–151) thermally polymerized aspartic acid using 85% phosphoric acid and polyphosphoric acid to obtain improved yields and higher molecular weight polysuccinimide. Neri et al [J. Med Chem., 16, 893 (1973)] also used phosphoric acid to facilitate condensation of aspartic acid under vacuum and in a thin film process to obtain high molecular weight polysuccinimide.

Aspartic acid has been thermally copolymerized simultaneously with seventeen amino acids at 175°180° to obtain polymers of molecular weight range 3000–9000.[S. W. Fox and K. Harada, J. Am. Chem. Soc., 82, 3745 (1960).] Copolymers of aspartic acid with glutamic acid and terpolymers of aspartic acid, glutamic acid and alanine have also been reported in the literature (S. W. Fox and K. Harada, "A Laboratory Manual of Analytical Methods of Protein Chemistry Including Polypeptides," P. Alexander and H. P. Lundgren., Ed., Pergamon Press, Elmsford, N.Y., 1966, p 127–151). Lysine has been copolymerized with aspartic acid and other amino acids and with non-amino acid monomers such as caprolactam, succinic acid, terephthalic acid (S. W. Fox and K. Harada, vida supra).

Harada [K.Harada, J. Org. Chem., 24 1662 (1959)] reported preparation of polysuccinimide by thermally condensing precursors of aspartic acid such as monoammonium malate, monoammonium maleate, maleamic acid and combinations of asparagine and malic acid, maleamic acid and malic acid, monoammonium malate and maleamic acid, malic acid and ammonium maleamate, maleic anhydride and ammonium maleamate, fumaric acid and ammonium maleamate.

Copolyamino acids of aspartic acid are prepared by Harada, et al (U.S. Pat. No. 4,590,260) by thermally polymerizing at least one amino acid with at least one precursor of aspartic acid such as monoammonium malate, ammonium salts of maleic or fumaric acid, an ammonium salt of maleic, malic, fumaric acid monoamide or diamide and hydrolyzing the reaction mixture under neutral or alkaline conditions.

Harada and Shimoyama (U.S. Pat. No. 4,696,981) prepared polysuccinimide from precursors of aspartic acid such as monoammonium, diammonium, monoamide, diamide and monoamideammonium salts of malic, maleic and fumaric acid and mixtures of these materials by irradiating them with microwaves. The resulting polysuccinimide was hydrolyzed to form polyaspartic acid. Similarly mixtures of at least one amino acid and precursors of aspartic acid were irradiated with microwaves followed by hydrolysis to produce copolyamino acids of aspartic acid (Harada and Shimoyama, U.S. Pat. No. 4,696,981).

German laid open document No. 4217847 discloses preparation of aspartic acid-amino acid copolymers, prepared by thermal condensation of L-aspartic acid with other amino acids followed by hydrolysis of the condensation reaction mixture.

These polymers were used to prevent encrustation during sugar juice evaporation.

Modified polyaspartic acids are prepared by polycocondensation of aspartic acid with carboxylic acids (monobasic and polybasic) and anhydrides, hydroxycarboxlic acids, alcohols, amines, alkoxylated alcohols and amines, aminosugars, carbohydrates, sugar carboxylic acids, and nonprotein forming amino-carboxylic acids (Ger. laid open document No. 4221875).

U.S. Pat. No. 5,286,810 discloses the preparation of higher molecular weight copolymers of polyaspartic acid which are suitable for the inhibition of scale deposition by reacting maleic acid and ammonia in stoichiometric excess with a diamine or a triamine at 120°350° C. The resulting copolymers of polysuccinimide are converted to a salt of the copolymer of polyaspartic acid by hydrolysis with a hydroxide.

Copolymers of polyaspartic acid are also made by reaction of part of the succinimide units in polysuccinimide with amines followed by hydrolysis of the remaining succinimide units to form aspartic acid units (Fujimoto et al., U.S. Pat. No. 3,846,380; Jaquet et al., U.S. Pat. No. 4,363,797).

Copolymers of polyaspartic acid are prepared by making maleic half esters followed by addition of an equivalent of ammonia and an amine and heating to 120°–350° C. When an equivalent of alcohol is distilled off, a copolymer of polysuccinimide is formed which is hydrolyzed with hydroxides to form amide copolymers of polyaspartic acid (Wood, U.S. Pat. No. 5,292,858).

SUMMARY OF THE INVENTION

Copolycondensation of precursors of aspartic acid such as monoammonium maleate with functional compounds containing amino, hydroxyl and carboxyl functional groups produces polysuccinimide copolymers which upon hydrolysis with alkali, alkaline earth or ammonium hydroxides are converted to polyaspartic acid copolymers and salts.

The copolycondensation reactions are done by direct thermal condensation of a mixture of an aspartic acid precursor such as monoammonium maleate with an amino, hydroxyl and carboxyl functional group-containing monomer at a temperature of at least 120° C.

The preferred temperature range is from 120° to 350° C. A more preferred temperature range is from 150° to 350° C. The most preferred temperature range is from 170° to 260° C.

Time of the reaction varies depending on temperature of the reaction. A preferred reaction time is from 2 minutes to 6 hours. A more preferred time is from 5 minutes to 3 hours. A most preferred time is from 5 minutes to 2 hour.

At temperatures of at least 120° C. low molecular weight polysuccinimide condensation copolymers are produced which when hydrolyzed with hydroxide have molecular weights in the range of Mw 600–100,000. Yields exceeding 60% are obtained.

Copolycondensation of aspartic acid precursors with hydroxycarboxylic acids and other functional monomers tends to lower molecular weight of the resulting polyaspartic acid copolymer. This effect can be overcome by preparing terpolymers in which a small amount of diamine is coreacted with the aspartic acid precursor and other functional monomers to produce a crosslinked polysuccinimide that has increased molecular weight.

DESCRIPTION OF THE PREFERRED EMBODIMENT

A series of experiments were performed whereby aspartic acid precursors such as mono and diammonium maleate, maleamic acid, ammonium maleamate, ammonium malate and mixtures of these and other precursors were copolycondensed thermally with a variety of mono, di and multifunctional monomers containing amino, hydroxyl and carboxyl functional groups. The resulting condensation copolymers and terpolymers contain succinimide units derived from the aspartic acid precursors, condensed with the other functional group monomers usually through amide and ester linkages. Hydrolysis of the polysuccinimide copolymers and terpolymers with alkali, alkaline earth or ammonium hydroxides produces aspartic acid copolymer and terpolymer salts.

Preparation of the aspartic acid copolymers and terpolymers of this invention is accomplished by thermal copolycondensation of (a) 1–99.9 mole % of aspartic acid and substituted aspartic acid precursors with (b) 99–0.1 mole % of a mono, di or multifunctional monomer containing amino, hydroxyl and carboxyl functional groups. The polysuccinimide copolymers and terpolymers resulting from this copolycondensation then are hydrolyzed using alkali, alkaline earth or ammonium hydroxides to form aspartic acid co- and ter- condensation polymer salts.

Aspartic acid and substituted aspartic acid precursors which may be used for this invention are: mono and diammonium maleate, maleamic acid, ammonium maleamate, mono and diammoniummalate, mono and diammonium fumarate, asparagine, monoammonium aspartate, mono and diammonium itaconate, mono and diammonium citraconate and mesaconate, mono and diammonium chlorosuccinate, mono and diammonium bromosuccinate, mono and diammoniummercaptosuccinate.

Mixtures of aspartic acid and substituted aspartic acid precursors may also be used for this invention and include combinations such as: maleic anhydride and ammonium carbonate, citraconic anhydride and ammonium carbonate, itaconic anhydride and ammonium carbonate, maleic anhydride and asparagine, citraconic anhydride and asparagine, itaconic anhydride and asparagine, maleic anhydride and ammonium maleamate, citraconic anhydride and ammonium maleamate, itaconic anhydride and ammonium maleamate, maleic anhydride and monoammonium aspartate, itaconic anhydride and monoammonium aspartate, maleic acid and ammonium carbonate, citraconic acid and ammonium carbonate, itaconic acid and ammonium carbonate, maleic acid and asparagine, citraconic acid and asparagine, itaconic acid and asparagine, maleic acid and ammonium maleamate, citraconic acid and ammonium maleamate, itaconic acid and ammonium maleamate, maleic acid and monoammonium aspartate, citraconic acid and monoammonium aspartate, itaconic acid and monoammonium aspartate, malic acid and ammonium carbonate, malic acid and asparagine, malic acid and ammonium maleamate, malic acid and monoammonium aspartate, fumaric acid and ammonium carbonate, fumaric acid and asparagine, fumaric acid and ammonium maleamate, fumaric acid and monoammonium aspartate, maleic anhydride and mono and diammonium maleate, citaconic anhydride and mono and diammoniummaleate, itaconic anhydride and mono and diammoniummaleate, maleic acid and mono and diammoniummaleate, fumaric acid and mono and diammonium maleate, malic acid and mono and diammonium maleate, itaconic acid and mono and diammoniummaleate, citraconic acid and mono and diammoniummaleate.

Mono, di and multifunctional monomers containing amino, hydroxyl and carboxyl functional groups which can condense and copolymerize with the aspartic acid precursors are the following types of compounds: polybasic carboxylic acids and anhydrides, fatty acids, polybasic hydroxycarboxylic acids, monobasic polyhydroxycarboxylic acids, alcohols, amines, di and triamines, polyamines, alkoxylated alcohols and alkoxylated amines, alkoxylated diamines and triamines, amino sugars, carbohydrates, sugar carboxylic acids, amino acids, non-protein forming aminocarboxylic acids, lactams, lactones, diols, triols, polyols, unsaturated dicarboxylic and tricarboxylic acids, unsaturated monocarboxylic acids.

Examples of functional monomers which can copolycondense with aspartic and substituted aspartic acid precursors are: lactic acid, citric acid, glycolic acid, malic acid, tartaric acid, succinic acid, adipic acid, butane-tetracarboxylic acid, gluconic acid, glucuronic acid, glucaric acid, aconitic acid, sulfosuccinic acid, phosphinicosuccinic acid, phosphonosuccinic acid, iminodiacetic acid, nitrilotriacetic acid, stearic acid, palmitic acid, cyclohexanedicarboxylic acid and anhydride, terephthalic acid, phthalic acid and anhydride, crotonic acid, sorbitol, glycerol, glucose, fructose, sucrose, maltose, glycine, alanine, aspartic acid, glutamic acid, lysine, serine, theonine, cystine, cysteine, ethylenediamine, diethylenetriamine, triethylenetetramine, polyamines, 1,6-diaminohexane, octadecylamime, glucosamine, alkoxylated amines, alkoxylated diamines and triamines, 6-aminocaproic acid, 4-aminobutyric acid, diaminocyclohexane, urea, melamine, carbohydrazide, hydrazine, ascorbic and isoascorbic acid, sorbic acid, maleuric acid, cyanuric acid, alkyldiamines, alkyltriamines, acrylic acid, methacrylic acid, maleic acid and anhydride, alkylmaleic acids, alkenylsuccinic acids and anhydrides, methylenemalonic acid.

The copolycondensations are done by thermal reaction of the aspartic acid and substituted aspartic acid precursors with the functional monomers. The preferred temperature range for these reactions is 120° to 350° C. A more preferred temperature range is from 150° to 350° C. The most preferred temperature range is from 170° to 260° C.

The time of the reaction varies depending on the temperature of the reaction. At higher reaction temperatures, less reaction time is needed to obtain complete reaction. A preferred reaction time is from 2 minutes to 6 hours. A more preferred reaction time is from 5 minutes to 3 hours. The most preferred reaction time is from 5 minutes to 2 hours.

The copolycondensation polymers of this invention can be prepared by three different methods: (Method A) thin layer polymerization, (Method B) thermal bulk polymerization and (Method C) in situ formation of aspartic acid precursor or substituted aspartic acid precursor from maleic anhydride or acid and other anhydrides and acids and ammonium carbonate or ammonium salt which then polycondenses with the functional comonomer present in the mixture.

In the thin layer polymerization process (A patent application has been filed.) monoammonium maleate or other aspartic acid precursors and the functional group monomers are thermally polymerized as a thin layer applied to a heated surface, such as, a conveyor belt or a high surface area particles such as diatomaceous earth and the like. This technique avoids the need to mix taffy-like intermediate reaction products, allows for fast heat transfer and allows for easier escape of gaseous products and water of condensation. As a result this process permits faster reaction times, higher molecular weights and is adaptable to a continuous manufacturing process.

The thin layer polymerization process as utilized in the copolycondensation reactions of this invention involves four steps which are:

1. Synthesis of the aspartic acid precursor such as mono or diammoniummaleate, maleamic acid, ammonium maleamate, mono or diammonium fumarate or mono and diammoniummalate.
2. Thorough mixing of the aspartic acid precursor with the functional monomer, usually accomplished by grinding the two or more reactants together.
3. Spreading the reactant mixture as a thin layer onto a surface which is heated or is in a heated zone and heating the layer to produce polysuccinimide condensation copolymers, as water of imidization is removed. Water removal can be facilitated using an inert gas sweep or by applying vacuum.
4. Removal of the product from the heated surface or heating zone.

For step 1, the aspartic acid precursor such as monoammonium maleate can be prepared in a conventional stirred reactor which has cooling capability and can be siphoned from the top or has a bottom valve. The precursor material can be isolated from the reaction mixture by filtration, spray drying or centrifuging. The thermal copolycondensation of step 3 can be done on a conveyor belt (stainless steel or temperature resistant composite) that enters an oven which consists of one or several heating zones. Air handling equipment is needed to quickly remove evolved gases and condensation vapors during step 3.

To demonstrate the thin layer polymerization process, copolycondensation reactions are described below in Examples 2, 3, 4, 5 and 10.

The thermal bulk polymerization method (Method B) for preparing the copolycondensation polymers of this invention involves heating the mixture of aspartic acid precursors and functional monomers together in a reaction vessel that is heated by a heat transfer fluid. Stirring of the reaction vessel is not convenient as the solid polysuccinimide condensation copolymer forms during the reaction from the melt of starting reactants. Heat transfer is less effective than with the thin layer process and as a result longer reaction times are employed. A one stage heating procedure is used i.e. the product is not returned to the reaction vessel (after grinding) for further heating. Examples 7, 8 and 9 describe thermal bulk polymerization.

The third method (Method C) for preparing the copolycondensation polymers of this invention utilizes the thin layer polymerization technique of Method A but in addition the aspartic acid precursor is produced in situ as for example from maleic anhydride and ammonium carbonate. Polysuccinimide has been prepared by this technique whereby the ammonia necessary for the aspartic acid precursor is provided in situ during the condensation reaction by thermal decomposition of ammonium salts, preferably ammonium carbonate. Ammonia released from ammonium carbonate reacts directly with the maleic anhydride, producing water and carbon dioxide as the by-products of the ammonium salt decomposition. (Patent application in progress.)

In Method C, the functional monomer is mixed thoroughly with maleic acid or anhydride or substituted maleic anhydride and the ammonium salt, (ammonium carbonate) which had previously been thoroughly mixed. The mixture of three reactants then is placed on a heated reaction surface for thin layer polymerization. A convection oven is used to supply the heat for this method. A continuous moving belt in a heat zone or oven could also be used to permit a continuous condensation process. An Example of this method is included in the experimental section as Example 6.

The polysuccinimide condensation copolymers made by any of the three methods are hydrolyzed to polyaspartic acid copolymers using alkali and alkaline earth or ammonium hydroxides. The hydroxides useful in hydrolysis of the copolymers have cations which are $Na^+$, $K^+$, $Mg^{++}$, $Li^+$, $Ca^{++}$, $Zn^{++}$, $Ba^{++}$, $Co^{++}$, $Fe^{++}$, $Fe^{+++}$ and $NH_4^+$.

The copolycondensation aspartic acid polymers obtained by the present invention are useful as scale inhibitors in water treatment to prevent deposition of calcium carbonate, calcium and barium sulfate and calcium phosphate in cooling water and boiler water. They are also useful in detergent formulations as a builder and anti-redeposition agent. They are useful in oral health care products and cosmetic formulations. Additional uses are for enhancing uptake of fertilizers and micronutrients in agriculture. Certain copolymers also may act as corrosion inhibitors in water systems. The copolymers can disperse solids in cooling water systems and act as dispersants for slurries of solids. These copolymers are useful as dispersants for ceramic slurries and as dispersants for pigments in paints. Molecular weight of the copolycondensation polymers of this invention are determined by first hydrolyzing the polysuccinimide copolymers to form the salt of an aspartic acid copolymer using aqueous metal or ammonium hydroxides. The aspartate copolymer then is analyzed by GPC to obtain molecular weight and molecular weight distributions.

Molecular weight of the copolycondensation polymers can vary depending upon type and amount of aspartic precursor used and type and amount of functional group monomer used. A preferred molecular weight range is from Mw 600 to 100,000. A more preferred range is from Mw 1000 to 60,000. A most preferred range is from Mw 1000 to 30,000.

Some copolycondensation reactions of the aspartic acid precursor and the functional group monomer result in production of lower molecular weight polyaspartic acid polymers than when the aspartic acid precursor is used alone. As an example, polymerization of monoammonium maleate produces a polysuccinimide which when hydrolyzed with hydroxide results in a polymer of molecular weight, Mw 1000–3000, usually Mw is about 2000. Copolymerization of monoammonium maleate with lactic acid, citric acid, alanine, maleic acid and itaconic acid resulted in polyaspartic acid copolymers with Mw of about 1000. This molecular weight lowering effect can be overcome by using a small amount of diamine or polyamine to crosslink the copolymer, resulting in a terpolymer. The crosslinking and copolymerization reactions were done simultaneously by mixing the three reactants together and performing the thermal condensation polymerization.

Amines which are suitable for the crosslinking and molecular weight building process are any polyamine which has at least two primary or secondary amine groups available for reaction. The preferred polyamines are those that have two primary amine groups present in the molecule. Another preferred polyamine can have at least one primary amine group and the other amine group in the molecule can be a primary or secondary amine. Examples of polyamines include ethylenediamine, diethylenetriamine, triethylenetetramine, tetraethylenepentamine, 1,6-hexanediamine, polyoxyalkyleneamines, polyoxyalkylenediamines, polyoxyalkylenetriamines, alkyldiamines, alkyltriamines, melamine, urea, diaminocyclohexane, carbohydrazide, polyethyleneimine, polyvinylamine, lysine.

Of the many diamines and polyamines useful for the crosslinking terpolymerization reaction during copolycondensation, lysine is especially interesting since the resulting aspartic acid-lysine terpolymers can be largely biodegradable. Fully biodegradable combinations can result from use of aspartic acid precursors, lysine and functional group monomers such as lactic acid, glycolic acid, citric acid, sugar acids, carbohydrates and amino sugars. This type of terpolymer is described in Example 9 using monoammonium maleate, lysine and lactic acid as the monomers.

In order to further describe the copolycondensation aspartic acid copolymers and terpolymers of this invention the following examples are given. Methods of preparation of these polymers are demonstrated using monoammonium maleate as the aspartic acid precursor, however other precursors can also be used. A partially wet form of monoammonium maleate was used in all reactions, however a fully dried monoammonium maleate can be used or a concentrated solution of monoammonium maleate can be used.

EXAMPLE 1

Synthesis of Wet Monoammonium Maleate

Deionized water (21.8 Kg) was added to a chilled 20 gallon jacketed reactor. Next, crushed maleic anhydride powder (21.8 Kg, 222.28 mol) was added carefully to the reactor. The resulting suspension was stirred with a mechanical stirrer and was cooled to 15° C. Next, aqueous ammonia (30 % w/w, 14.08 Kg, 244.89 mol) was slowly added to the stirred reaction contents by means of a dip tube over a one hour period. The temperature of the reaction contents was maintained below 30° C. during this time. After he ammonia addition was completed, the resulting suspension was filtered. The wet solid was stored in a drum. Three additional experiments were conducted using the above procedure and the solids were combined with the solid obtained from the first experiment. The wet solids from all four experiments were allowed to air dry for two days to give a moist colorless product (56.3 Kg). The product was identified as monoammonium maleate by TLC (1:5 MeOH:EtOAc; Polygram $SiO_2$; Rf 0.09) and was found to contain 6% water by weight by Karl Fisher titration. A sodium hydroxide titration indicated that the product contained 93.4% monoammonium maleate and 6.6% diammoniummaleate.

EXAMPLE 2

General Procedure of Thin Layer Polymerization

Monoammonium maleate or other aspartic acid precursor and a functional group comonomer such as an hydroxycarboxylic acid, diamine or triamine, polybasic acid etc. or another amino acid were thoroughly mixed by grinding together in a mortar and pestle. The resulting mash or solid mass of crystals was then placed in a glass or aluminum reaction vessel (5 cm diameter ×1.5 cm deep) and spread out to form a layer on the bottom of the vessel. Sample sizes of 3 to 4 g were normally used. Composition of the mix of aspartic acid precursor and functional group comonomer varied from 1 to 99.9 mole % of monoammonium maleate or other aspartic acid precursor to 99 to 0.1M % of the functional group comonomer or amino acid. The vessel containing the reaction mixture was then placed in a convection oven that had been preheated to a selected reaction temperature. Reaction temperature was chosen in the range of 100° to 350° C. with the most preferred range being 170° to 260° C. A reaction time of 2 minutes to 6 hours was used depending on the temperature of the reaction. A more preferred reaction time was 5 minutes to 3 hours. The most preferred reaction time was 5 minutes to 2 hour. During the heating time, water of crystallization, if present, and water of condensation rapidly boiled off to leave a brittle, foamed solid polysuccinimide copolymer, usually an orange-red colored product. After the reaction was completed, the sample was quickly removed from the oven and was left to cool to room temperature. The cooled product was weighed to determine weight loss during reaction as a measure of extent of reaction. The sample was crushed and retained for hydrolysis to aspartic acid copolymer.

The products were analyzed for molecular weight by size exclusion chromatography. In this procedure the product (0.5 g) was combined with sodium hydroxide solution (1 N, 5.2 mL) and stirred to give a solution. A portion of this solution (0.5 g) was combined with potassium phosphate dibasic solution(0.1 M, 5.5 g). The resultant was filtered through a 0.45 μm filter (nylon) and subjected to instrumental analysis. The instrumental setup consisted of (1) an HPLC pump (Shimadzu model LC-10AD), (2) a mobile phase (0.05 M $KH_2PO_4$ soln.) which carried the analyte (20 uL) at a rate of 0.4 mL/min, (3) two size exclusion chromatography columns (SynChropak GPC 100, GPC 500), and (4) an ultraviolet (220 nm) detector. The instrument was standardized using sodium polyacrylate standards (Polysciences, Inc.) of narrow molecular weight distributions. Weight average (Mw) and number average (Mn) molecular weights were obtained using an algorithm in the data handling system (Hitachi D-2520 GPC integrator).

Examples of functional group monomers and amino acids used in this procedure are:

citric acid, lactic acid, maleic acid, succinic acid, ethylene glycol, sorbitol, glycerol, glucose, low molecular weight (Mw 1200) polysuccinimide, maleamic acid, alanine, lysine, ammonium lactate, diethylenetriamine and Jeffamime ED-600 (an oxyalkylated diamine).

EXAMPLE 3

Monoammonium maleate (2,627 g of 94% concentration wet salt, 0.0186 mole) and citric acid (0,395 g, 0.0021 mole) were ground together and thoroughly mixed to form a slightly wetted mass. This mixture was placed in the aluminum reaction vessel to form a layer and then was heated at about 240°–260° C. for 40 minutes in a convection oven. The resulting product was a red-brown solid foam, weight 1.991 g, representing 92% theoretical yield of polysuccinimidecitric acid copolymer. Hydrolysis of this product with sodium hydroxide at room temperature produced an aspartic acid-citric acid copolymer having molecular weights by GPC of Mw 1196, Mn 613, Mw/Mn 1.95.

EXAMPLE 4

Monoammonium maleate (3.00 g of 94% wet salt, 0.0212 mole) and succinic acid (0,278 g, 0.0024 mole) were thoroughly mixed together and then were reacted as in Example 2 and 3 by heating in a convection oven at 230°240° C. for 40 minutes. A brittle, red-brown solid was obtained which weighed 2,204 g. Hydrolysis of this product with sodium hydroxide produced an aspartic acid copolymer having molecular weights by GPC of Mw 1717, Mn 1016, Mw/Mn 1.69.

EXAMPLE 5

Monoammonium maleate (2.993 g of 94% wet salt, 0.0212 mole) and diethylenetriamine(0,115 g, 0.0011 mole) were mixed together and reacted according to the procedure of Example 2 and 3 at 230° -255° C for 40 minutes. The resulting polysuccinimide-diethylenetriamine crosslinked copolymer weighed 1,970 g. Hydrolysis of this product produced an aspartic acid-diethylenetriamine copolymer having molecular weights by GPC of Mw 5207, Mn 1359, Mw/Mn 3.83.

Example 6

Maleic anhydride (1,924 g, 0.0196 mole) was ground together with ammonium carbonate (31.3% as ammonia) (1.117 g, 0.0206 equiv. of ammonia) to form a premix. To the premix was added diethylenetriamine (0.183 g, 0.0018 mole) and the mixture was ground together to thoroughly mix the components. This mixture was then placed as a layer in an aluminum reaction vessel as described in Example 2. The mixture was heated in a convection oven at 230°–255° C. for 40 minutes to produce a brittle, red-brown crosslinked polysuccinimide copolymer. Weight of product from this reaction was 2,101 g. The polysuccinimide was hydrolyzed with sodium hydroxide to produce polyaspartic acid-diethylenetriamine crosslinked copolymer having molecular weight by GPC of Mw 3030, Mn 364.

EXAMPLE 7

Monoammonium maleate (2.859 g of 94% wet salt, 0.0202 mole) and lysine (0.165 g, 0.0011 mole) were ground together for thorough mixing. This mixture was transferred into an open reaction vessel and the vessel was placed in an oil bath which was preheated to 245°–250° C. Heating of the reaction mixture was continued for one hour at 245°–250° C. The reaction product was then cooled and weighed 2.161 g., about 100% yield of polysuccinimide-lysine crosslinked copolymer. Hydrolysis of this copolymer using sodium hydroxide at room temperature produced aspartic acid-lysine copolymer having a molecular weight by GPC of Mw 10,989, Mn 1928, Mw/Mn 5.70.

EXAMPLE 8

Using the same procedure as described in Example 7, monoammonium maleate (2.824 g of 94% wet salt, 0.0200 mole) was mixed thoroughly with lactic acid (0.200 g., 0.0022 mole) and reacted together for an hour at 245°–250° C. A Yield of 2,134g of polysuccinimide-lactic acid copolymer was obtained. Hydrolysis of this copolymer at room temperature produced aspartic acid-lactic and copolymer having GPC molecular weights of Mw 1025, Mn 521, Mw/Mn 1.96).

EXAMPLE 9

Using the same procedure as employed in Examples 7 and 8, monoammonium maleate (2,738g of 94% wet salt, 0.0194 mole), lactic acid (0,215g, 0.0024 mole) and diethylenetriamine (0,116 g, 0.0011 mole) were mixed thoroughly and then were reacted together at 245°–250° for one hour. A yield of 2.1 01 g of polysuccinimide-lactic acid-diethylenetriamine terpolymer was obtained. Upon hydrolysis with sodium hydroxide polyaspartic acid-lactic acid-diethylenetriamine crosslinked terpolymer was produced. Molecular weights were determined by GPC to be Mw 3925 Mn 1063, Mw/Mn 3.69.

Using the same procedure and reaction conditions as for Examples 8 and 9, monoammonium maleate was thermally polymerized to produce polysuccinimide. Upon hydrolysis of this polysuccinimide, a polyaspartic acid was produced having GPC molecular weights of Mw 1975, Mn 958, Mw/Mn 2.06.

Comparing the molecular weight of polyaspartic acid made by the above procedure (Mw 1975) to the molecular weight of the aspartic acid-lactic acid copolymer of Example 8 (Mw 1025) it can be seen that molecular weight was reduced in the copolymer. This reduction of molecular weight effect was overcome by using a small amount (4.8M%) of diethylenetriamine in Example 9 (Mw 3925). Similarly other diamines and polyamines can be used to make crosslinked polyaspartic acid terpolymers. The utilization of lysine as the crosslinking diamine is of special interest since its use, as for example, in .an aspartic acid, lactic acid, lysine terpolymer, permits formation of a fully biodegradable polymer. Other terpolymer combinations which would be nearly fully biodegradable are:

a) aspartic acid (made by using aspartic acid precursors) plus lysine, terpolymerized with
b) citric acid, malic acid, glycolic acid, tartaric acid, gluconic acid, glucaric acid, glucuronic acid, carbohydrates, glycerol, sorbitol, sugar carboxylic acids, amino-sugars, diols, triols, polyols.

EXAMPLE 10

Using the procedure of Example 2 monoammonium maleate (3.068g of 95% wet salt, 0.0217 mole) and glycerol (0.264g., 0.0029 mole) were reacted together as a thin layer at 230°–240° C. for 40 minutes to produce polysuccinimide-glycerol copolymer. A brittle, red-brown foamed solid product was obtained, 2,344g. Hydrolysis of this product with sodium hydroxide produced polyaspartic acid-glycerol copolymer having a GPC molecular weight of Mw 2217, Mn 1265, Mw/Mn 1.75.

We claim:

1. A method for producing aspartic acid copolymers and salts which comprises heating mixtures of aspartic acid precursors and substituted aspartic acid precursors with amino, hydroxyl, and substituted aspartic acid precursors with amino, hydroxyl, and carboxyl functional group containing monomers at a temperature of at least 120° C. a sufficient length of time for thermal polymerization to a polysuccinimide copolymer to occur and subsequently hydrolyzing the polysuccinimide copolymer with alkali, alkaline earth, or ammonium hydroxides, to form the aspartic acid copolymer and salts, wherein the said mixture of aspartic acid precursors and substituted aspartic acid precursors comprise at least one of the following combinations of compounds: maleic anhydride and ammonium carbonate, citraconic anhydride and ammonium carbonate, itaconic anhydride and ammonium carbonate, maleic anhydride and asparagine, citraconic anhydride and asparagine, iraconic anhydride and asparagine, maleic anhydride and ammonium maleamate, citraconic anhydride and ammonium maleamate, itaconic anhydride and ammonium maleamate, maleic anhydride and monoammonium aspartate, itaconic anhydride and monoammonium aspartate, maleic acid and ammonium carbonate, citraconic acid and ammonium carbonate, itaconic acid and ammonium carbonate, maleic acid and asparagine, citraconic acid and asparagine, itaconic acid and asparagine, maleic acid and ammonium maleamate, citraconic acid and ammonium maleamate, iraconic acid and ammonium maleamate, maleic acid and monoammonium aspartate, citraconic acid and monoamonium aspartate, itaconic acid and monoammonium aspartate, malic acid and ammonium carbonate, malic acid and asparagine, malic acid and ammonium maleamate, malic acid and monoammonium aspartate, fumaric acid and ammonium carbonate, fumaric acid and asparagine, fumaric acid and ammonium maleamate, fumaric acid and monoammonium aspartate, maleic anhydride and mono and diammonium maleate, citraconic anhydride and mono and diammonium maleate, iraconic anhydride and mono and diammonium maleamate, maleic acid and mono and diammonium maleamate, malic acid and mono and diammonium maleamate, iraconic acid and mono and diammonium maleate, citraconic acid and mono and diammonium maleate.

2. The method in accordance with claim 1 wherein the said amino, hydroxyl and carboxyl functional group-containing monomers comprise at least one of the following compounds: lactic acid, citric acid, glycolic acid, malic acid, tartaric acid, succinic acid, adipic acid, butanetetracarboxylic acid, gluconic acid, glucluronic acid, glucaric acid, aconitic acid, sulfosuccinic acid, phosphinicosuccinic acid, phosphonosuccinic acid, iminodiacetic acid, nitrilotriacetic acid, stearic acid, palmitic acid, cyclohexanedicarboxylic acid, cyclohexanedicarboxylic acid anhydride, terephthalic acid, phthalic acid, phthalic acid and anhydride, crotonic acid, sorbitol, glycerol, glucose, fructose, sucrose, maltose, glycine, alanine, aspartic acid, glutamic acid, lysine, serine, threonine, cystine, cysteine, ethylenediamine, diethylenetriamine, triethylenetetramine, polyamines, 1,6-diaminohexane, octadecylamine, glucosamine, alkoxylated amines, alkoxylated diamines, alkoxylated triamines, 6-aminocaproic acid, 4-aminobutyric acid, diaminocyclohexane, urea, melamine, carbohydrazide, hydrazine, ascorbic acid, isoascorbic acid, sorbic acid, maleuric acid, cyanuric acid, alkyldiamines, alkyltriamines, acrylic acid, methacrylic acid, alkyltriamines, acrylic acid, methacrylic acid, maleic acid and anhydride, alkylmaleic acids, alkenylsuccinic acids and anhydrides, methlenemalonic acid.

3. The method in accordance with claim 1 wherein the said amino, hydroxyl, and carboxyl functional group-containing monomers comprise at least one of the following compounds: lactic acid, citric acid, glycolic acid, malic acid, tartaric acid, succinic acid adipic acid, butanetetracarboxylic acid, gluconic acid, glucuronic acid, glucaric acid, aconitic acid, sulfosuccinic acid, phosphoinicosuccinic acid, phosphonosuccinic acid, iminodiacetic acid, nitrilotriacetic acid, stearic acid, palmitic acid, cyclohexanedicarboxylic acid, cyclohexanedicarboxylic acid anhydride, terephthalic acid, phthalic acid, phthalic acid anhydride, crotonic acid, sorbitol, glycerol, glucose, fructose, sucrose, maltose, glycine, alanine, glutamic acid, lysine, serine, threonine, cystine, cysteine, ethylenediamine, diethylenetriamine, triethylenetetramine, polyamines, 1,6-diaminohexane, octadecylamine, glucosamine, alkoxylated amines, alkoxylated diamines, alkoxylated triamines, 6-aminocaproic acid, 4-aminobutyric acid, diaminocyclohexane, urea, melamine, carbohydrates, hydrazine, ascorbic acid, isoascorbic acid, sorbic acid, maleuric acid, cyanuric acid, alkyldiamines, alkyltriamines, acrylic acid, methacrylic acid, maleic acid and anhydride, alkylmaleic acids, alkenylsuccinic acids and anhydrides, methylenemalonic acid.

4. The method in accordance with claim 1 wherein the said hydroxides include at least one of the following compounds: sodium hydroxide, potassium hydroxide, magnesium hydroxide, lithium hydroxide, calcium hydroxide, zinc hydroxide, barium hydroxide, cobalt hydroxide, ferric hydroxide, ferrous hydroxide, ammonium hydroxide.

5. The method in accordance with claim 3 wherein the said hydroxides include at least one of the following compounds: sodium hydroxide, potassium hydroxide, magnesium hydroxide, lithium hydroxide, calcium hydroxide, zinc hydroxide, barium hydroxide, cobalt hydroxide, ferric hydroxide, ferrous hydroxide, ammonium hydroxide.

* * * * *